Nov. 17, 1964     T. J. COLLINS ETAL     3,157,300
TRAILER FOR HAULING AND DUMPING LOOSE MATERIAL
Filed May 13, 1963     2 Sheets-Sheet 1
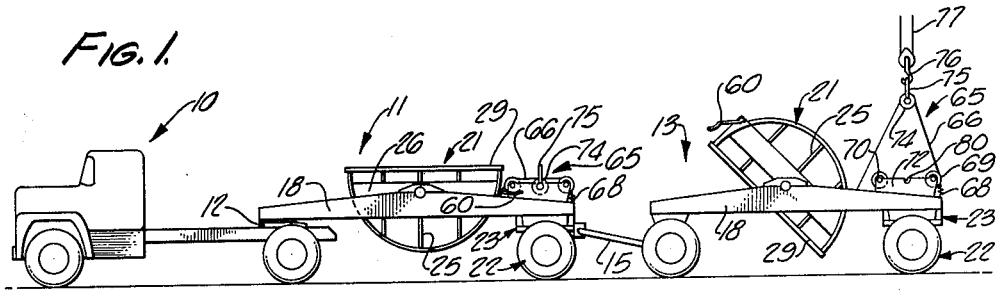
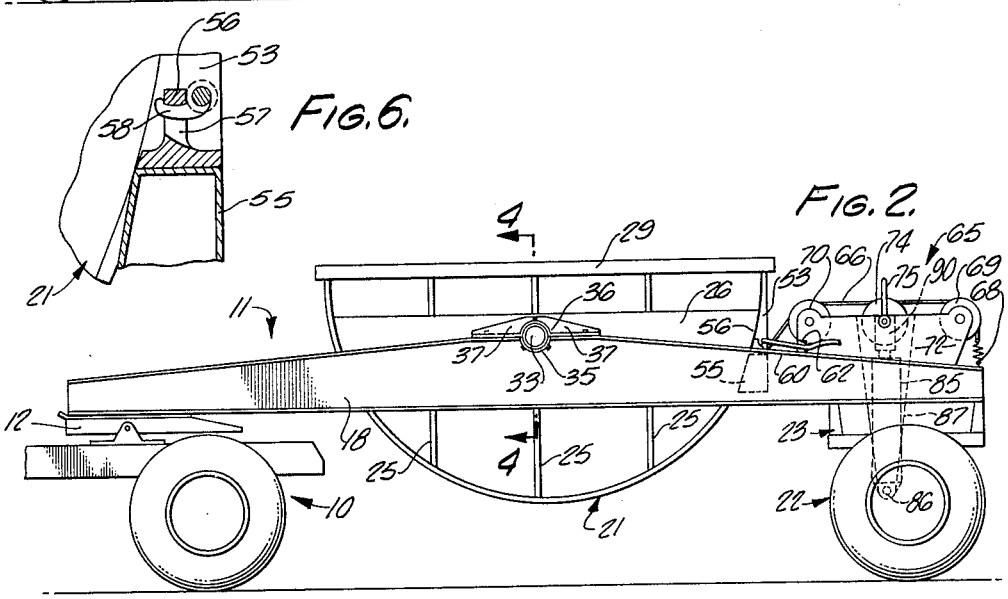
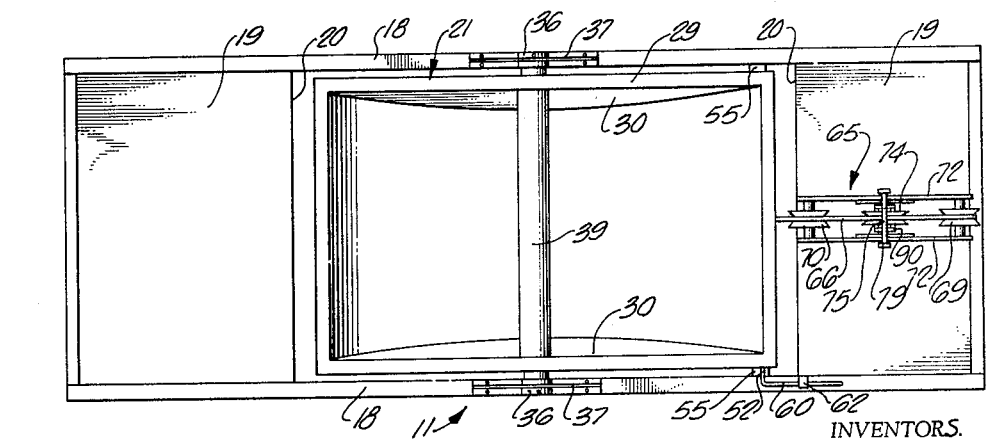
INVENTORS.
THOMAS J. COLLINS
JOSEPH W. WELLS
BY
ATTORNEY Nov. 17, 1964 T. J. COLLINS ETAL 3,157,300
TRAILER FOR HAULING AND DUMPING LOOSE MATERIAL
Filed May 13, 1963 2 Sheets-Sheet 2
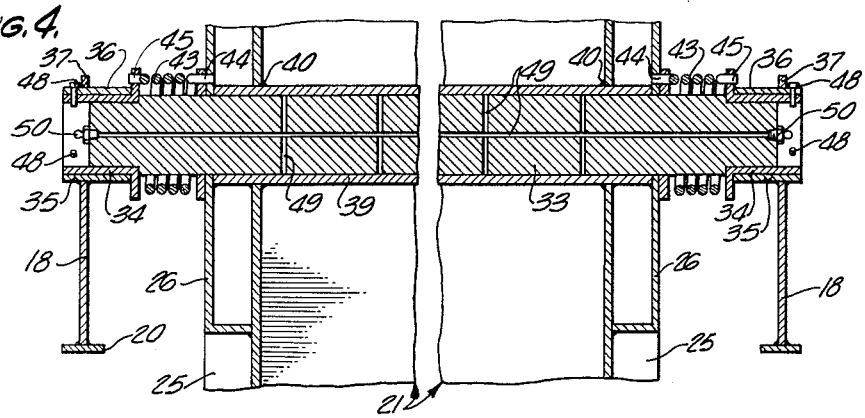
Fig. 4.
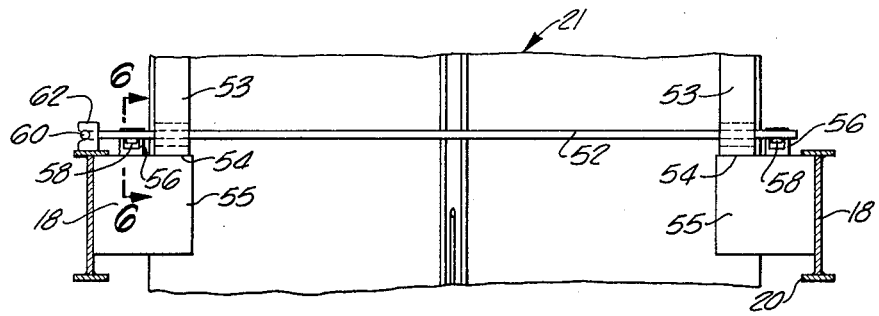
Fig. 5.
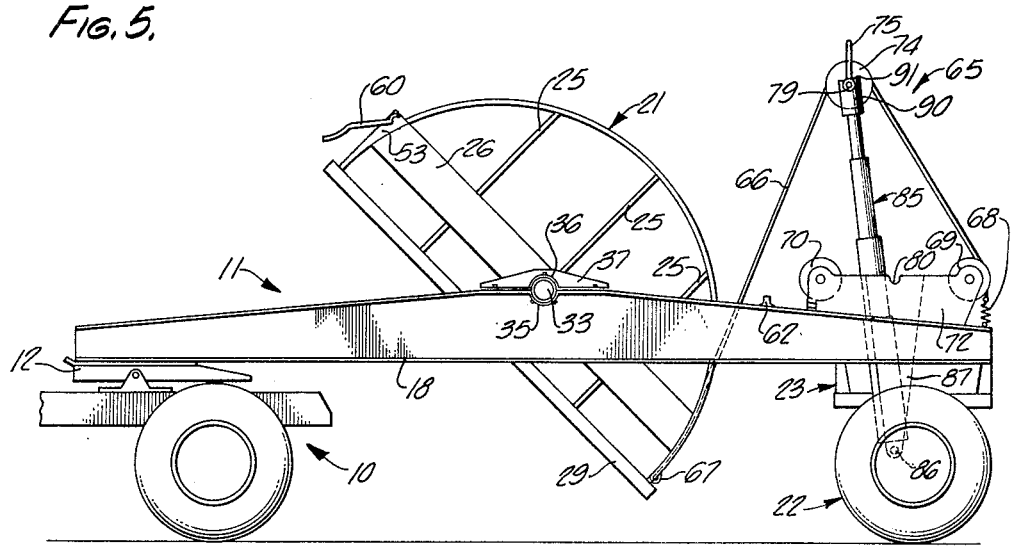
Fig. 7.
INVENTORS.
THOMAS J. COLLINS
JOSEPH W. WELLS
BY
ATTORNEY United States Patent Office 3,157,300
Patented Nov. 17, 1964

3,157,300
TRAILER FOR HAULING AND DUMPING
LOOSE MATERIAL
Thomas J. Collins, 1517 Rexford Place, and Joseph W. Wells, 725 Rancho Circle, both of Las Vegas, Nev.
Filed May 13, 1963, Ser. No. 279,829
15 Claims. (Cl. 214—64)

This invention relates to cargo trailers and more particularly to a heavy-duty trailer adapted for use in a cargo train powered by a hauling tractor and characterized by the use of dumping tubs having simple, highly effective means for pivotally supporting the tubs as well as for dumping them and returning them to their upright carrying position.

This application is a continuation-in-part of our earlier filed, but now abandoned, application for United States Letters Patent Serial No. 187,581, filed April 16, 1962, entitled Tub Dump Trailer.

A wide variety of proposals have been made heretofore for dumping trailers designed to handle bulk material. These have been quite successful for many applications but are found to have serious shortcomings when hauling other materials. For example, it has been common practice to employ trailers equipped with large-capacity hoppers open at their top and having discharge openings at their bottoms normally closed by various types of closure devices. Satisfactory closure devices for large-capacity hoppers present serious problems as respects the additional weight involved in their use, the provision of satisfactory means for opening and closing them. Also, when used to haul very fine free-flowing material, serious sealing problems are encountered to safeguard against loss of material in transit and littering of the roadway.

In view of the foregoing and numerous other shortcomings and disadvantages of cargo trailers as previously designed, it is a primary object of the present invention to obviate these by providing a low-cost, rugged, highly reliable cargo-hauling trailer of unusually large capacity having numerous features of novelty.

More particularly there is provided by the present invention an over-the-road cargo trailer adapted to be operated alone or in tandem rearward of a hauling tractor and utilizing a pivoting tub journaled transversely of the trailer frame and effective to dump its contents quickly by tilting action about its support axis. All cargo is introduced and discharged through its open topside thereby avoiding risk of leakage normally occurring when bottom closure devices are employed, the need for a separate discharge opening, closure devices therefor, and operating means for these closures, as well as all seals.

A feature of the design is the provision of cable means for tilting the tub to dumping position and arranged to be operated selectively either by an overhead hoist or by a fluid-operated device mounted directly on the trailer. Counterbalancing the tub to its upright carrying position is achieved through use of torsion-type counterbalance springs. Additionally, simple and highly effective lock means are provided for locking the tub in its stationary load-carrying position at all times except when being emptied.

Accordingly, it is a primary object of the present invention to provide a new and improved cargo-hauling trailer featuring simplicity, economy of construction, ruggedness and simple means for operating the tub-type hopper between carrying and dumping position.

Another object of the invention is the provision of a tub-type cargo trailer utilizing a single cargo tub pivotally supported transversely of the trailer by means including a stationary shaft enclosed in its midportion by a combined housing and spacer for the side walls of the tub.

Another object of the invention is the provision of a cargo-hauling trailer having a single carrying tub pivoted thereon and arranged to be rotated to dumping position by a cable power means external of the trailer and including provision for optionally tensioning the cable with alternate power means mounted on the trailer and usable selectively without need for making any adjustments.

These and other more specific objects will appear upon reading the following specification and claims and upon considering in connection therewith the attached drawing to which they relate.

Referring now to the drawing in which a preferred embodiment of the invention is illustrated.

FIGURE 1 is a side elevational view of a tandem cargo train constructed in accordance with this invention and showing one of the cargo tubs in dumping position;

FIGURE 2 is a side elevational view of one of the trailers on an enlarged scale;

FIGURE 3 is a top plan view of FIGURE 2;

FIGURE 4 is an enlarged cross-sectional view through the tub journal assembly taken along line 4—4 on FIGURE 2;

FIGURE 5 is a fragmentary cross-sectional view crosswise of the trailer and showing details of the tub locking facility;

FIGURE 6 is a fragmentary detail view on an enlarged scale taken along line 6—6 on FIGURE 5; and FIGURE 7 is a side elevational view showing the tub in the process of being dumped by power means carried on the trailer.

Referring to FIGURE 1, there is shown a tandem cargo train comprising a hauling tractor 10, a semi-trailer 11 having its forward end secured to tractor 10 by a conventional fifth wheel 12 and a trailer 13 coupled to the rear of semitrailer 11 by a hitch 15. It will be understood that semitrailer 11 and trailer 13 differ in no essential respects, the former merely being designed for attachment to a fifth wheel and the latter having four wheels and being designed for hauling by hitch 15.

The main frame of the trailers is generally rectangular when viewed from above and includes a pair of modified eye-beams 18, 18 employed as side frames and rigidly interconnected at their opposite ends by heavy-duty cross framing 19, 19 (FIGURE 3) of any suitable character, and leaving a large rectangular opening 20 therebetween in which cargo tub 21 is pivotally supported. The rear end of the trailer is supported by a suitable carriage 22 appropriately secured beneath the rear end of the main frame by suitable wheeled suspension assemblies indicated at 23.

Cargo tub 21, as here shown, is fabricated from heavy-gauge sheet steel plates welded together and suitably reinforced, preferably along their exterior sides as is indicated at 25. Secured along the exterior opposite side walls is further reinforcing means comprising channel-shaped member 26 having its web spaced outwardly from the tub walls and the edges of its inturned flanges welded against the tub side walls. Additionally, the upper rim of the tub-shaped bucket is formed by structural steel members welded together to form a high-strength rim 29 of generally rectangular shape in cross-section. It will be appreciated that this shape is not of particular importance except for the convenience and ease with which it can be fabricated from standard structural components. To be noted from FIGURE 3 is the fact that the interior side walls 30 of the bucket slope inwardly and downwardly at a small angle and that all interior surfaces of the bucket are smooth and free of obstructions interfering with the free discharge of the contents.

Referring to FIGURES 4 and 5, it is pointed out that the means for rotatably suspending bucket 21 comprises a heavy-duty stationary shaft 33 having its opposite ends fixed interiorly of flanged sleeves 34, 34. The latter have a close rotary fit within the two halves of a tubular bracket the lower half 35 of which is welded to side frame members 18, 18 and the upper half 36 of which includes bracket members 37 extending lengthwise of the trailer frame. These brackets are suitably and removably secured to the upper edges of frame members 18, 18 by bolts, cap screws or the like. Shaft 33 extends through openings in the opposite side walls of bucket 21 and through a close fitting tubular housing 39 (FIGURE 4) having a length corresponding to the distance between the webs of channel members 26, 26 or between the interior surfaces of bucket 21, as preferred. Accordingly, it will be understood that housing tube 39 serves not only as a bearing and support for the bucket but, additionally, as a spacer for holding the opposite side walls of the bucket from flexing inwardly toward one another under load. To assure this latter purpose, housing 39 is welded or otherwise firmly secured to the bucket side walls as indicated at 40.

An important component of the cargo tub and its mounting is a pair of torsion or counterbalance springs 43, 43 surrounding the outer ends of shaft 33. The adjacent interior ends 44 of these springs are anchored in the side wall of the tub whereas the outer ends 45 are seated in openings in the flange of associated sleeves 34. The latter may be rotated clockwise or counterclockwise about the ends of the shaft 33 in the requisite amount to load the springs sufficiently to return the tub to its upright cargo-carrying position shown in FIGURES 1 and 2. Once the sleeves have been adjusted to the proper position to load the springs as just stated, they are held there while being locked immovably in this position by one and preferably several cap screws 48 extending through openings in the bearing tube 35, 36 and threaded into bores in sleeve 34. It is further pointed out that shaft 33 is provided with passages 49 provided with greasegun fittings 50 at the ends of the shaft and effective to convey lubricant into the interface between the shaft and housing 39.

Referring now to FIGURE 5, it is pointed out that the tub is normally locked in its upright carrying position as by a rocking shaft 52 extending across the rear periphery of the tub and journaled in brackets 53. The lower horizontal ends 54 (FIGURE 5) of brackets 53 are positioned to engage the adjacent top surface of stops 55 welded to the interior side of trailer frame members 18 and act to limit rotation of the tub in one direction. A pair of detent members 56 (FIGURE 6) having openings 57 are welded to stops 55 closely beside the exterior side walls of the bucket and cooperate with hooks 58 fixed to shaft 52 to lock bucket 21 firmly and immovably in its upright position. When so locked, the lower ends 54 of brackets 53 are seated against stops 55 in the manner shown in FIGURES 2 and 5. Rotation of shaft 52 and of hooks 58 is accomplished by means of an operating handle 60 integral with one end of shaft 52. This operating handle overlies one of the side frames 18 of the trailer and is sufficiently resilient as to be moved into and out of locking engagement with a notch in the side of a detent 62 welded to the top edge of side 18 in the manner best shown in FIGURES 2 and 5.

The tub dumping means 65 will now be described with reference to FIGURES 1, 2, 3 and 7. As shown, this means is mounted at the rear end of the trailer though it could be located at the forward end, if desired, by reversing the action of counterbalance springs 43 and of the stops and locking means. Dumping means 65 includes a flexible cable 66 having its forward end 67 anchored to the forward exterior portion of bucket 21 and its rear end connected to the rear of the trailer frame through a cable tensioning and slack take-up spring 68. Cable 66 passes over a pair of deeply grooved guide rollers 69, 70 mounted between upright brackets 72 forming part of the trailer frame. Embracing the cable between rollers 69, 70 is a pulley block 74 having a bail 75 projecting upwardly above the cable and adapted to be engaged by a hook 76 of a hoist 77 (FIGURE 1) suitably supported at a cargo dumping station or pit. The opposite ends of pin 79 holding bail 75 connected to the pulley block project laterally to either side of bracket 72 and are normally cradled in a notch 80 of these brackets (FIGURE 7).

Wherever the dumping pit is provided with a hoist 77 dumping is accomplished simply by engaging the hoist hook 76 with the bail of the hooking block. After unlocking the tub the hoist is operated to elevate pulling block 74 thereby tensioning the cable and tilting tub 21 counterclockwise to dump it in the manner made clear by FIGURE 1. In this operation torsion springs 43 are further tensioned so that upon lowering the hoist these springs maintain the cable under tension as they rotate the bucket clockwise to its normal carrying position.

In other applications and uses of the equipment lacking hoisting facilities, it is desirable to employ power-operating means preferably installed on the trailer and usable to dump the bucket without need for any equipment external to the trailer. This is accomplished by means of the alternate operating means comprising a multiple-stage cylinder and piston assembly 85 having its lower end pivotally supported at 86 (FIGURE 7) to the lower part of the trailer frame, as to upright bracket members 87 located to either side of the cylinder assembly. The latter assembly may tilt through a short arc lengthwise of the trailer as is indicated in the drawings. The upper end of the assembly has a bifurcated fitting 90 straddling pulley block 74 and notched transversely of its upper end to seat the ends 79 (FIGURE 3) of the pulley block pin. Leaf springs, not shown, may bear against the forward and rear sides at the lower end of the cylinder assembly in a manner biasing the cylinder normally to a neutral position with its notches 91 aligned with notches 80 in the fully retracted position of the cylinder. It will therefore be apparent that notches 91 are properly positioned to receive and seat the ends 79 of the pulley block pin as the cylinder is extended to dump tub 21. The cylinder is controlled in the usual manner by the application of pressurized fluid to its lower end. Except when being used to dump tub 21, the upper end of the cylinder remains unattached to the pulley block and the latter is free for use to dump the tub using a hoist or other lifting means.

While the particular trailer for hauling and dumping loose material herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A heavy-duty mobile trailer for hauling bulk loose material, said trailer having a generally horizontally disposed rectangular frame supported at its ends on separate carriage means, heavy-duty shaft means extending transversely of the midportion of said frame, a semicylindrical cargo bucket journaled on said shaft means and including a tubular housing enclosing said shaft between the side walls thereof and having its ends secured to said side walls to hold the same in a desired relationship to one another, strong counterbalance spring means encircling said shaft means anchored at one end to said bucket and at its other end to a stationary part of said frame, said spring means urging said bucket to pivot away from dumping position toward its upright cargo-carrying position, and means for positively locking said bucket in said cargo-carrying position.

2. The combination defined in claim 1 characterized in the provision of means for rotating said bucket about said shaft to a cargo-dumping position, said last-mentioned means including flexible cable means having a first end connected to one end portion of said rectangular frame and extending over roller means supported in an upright position on said one end of said frame, said cable means being held against the underside of said bucket and having its second end attached to said bucket on the wall thereof remote from said one end of said frame, and pulley means engageable with said cable in an area thereof positioned between said roller means and said first cable end and adapted to be elevated thereby to tilt said bucket toward its dumping position.

3. The combination defined in claim 1 characterized in that said shaft is fixed to said rectangular frame and provided with lubricant-distributing passages chargeable with lubricant from one end of said shaft means and opening into the bearing space between its exterior and said tubular housing.

4. The combination defined in claim 2 characterized in that said pulley means includes a bail means projecting upwardly from the opposite sides thereof, said bail means being engageable with a hoist hook or the like for elevating said cable to dump said bucket.

5. The combination defined in claim 4 characterized in the provision of power means mounted on said rectangular frame and underlying said pulley means, said power means being movable generally vertically to elevate said pulley means thereby to tension said cable means and rotate said bucket to dumping position.

6. The combination defined in claim 4 characterized in that said power means includes a fluid-operated extendable ram assembly having means at its upper end adapted to seat and cradle said pulley means therein.

7. The combination defined in claim 4 characterized in that said pulley means is free to be lifted out of said socket means when said pulley bail is lifted upwardly by a hoist or the like and being automatically reseatable in said socket means when said pulley means is released and allowed to settle thereinto under gravity.

8. In combination, a heavy-duty trailer assembly for hauling loose bulk material and for dumping the same beneath and between the opposite ends of said trailer assembly, said trailer assembly having long rigid side frames rigidly connected together transversely of their opposite ends, carriage means supporting said frame ends, semicylindrical bucket means journaled on an axis extending crosswise between the midportions of said side frames and pivotable to and fro through an arc in excess of 90 degrees from its normal upright cargo-carrying position to a dumping position, means for releasably locking said bucket in said upright position, dumping means for said bucket comprising a cable having a first end attached to one transverse wall of the bucket and extending along the underside thereof to an anchor point near one end of said side frames, a pair of guide roller means supporting spaced-apart portions of said cable between said anchor and the adjacent transverse edge of the bucket, and means associated with said cable between said guide roller means and useful in applying a lifting force to said cable between said guide roller means thereby to tension the cable and rotate said bucket toward the dumping position thereof.

9. The combination defined in claim 8 characterized in the provision of extendable cylinder and piston means supported on said trailer beneath said cable in a zone between said guide roller means and operable when energized with pressurized fluid to elevate and tension said cable to dump said bucket.

10. The combination defined in claim 9 characterized in the provision of means for returning said bucket to its said upright position upon retraction of said cylinder and piston means.

11. The combination defined in claim 9 characterized in the provision of pivot means connecting said cylinder and piston means to said trailer for limited pivotal movement in a vertical arc extending lengthwise of said trailer.

12. The combination defined in claim 9 characterized in that said cable is free of fixed attachment to the upper end of said cylinder and piston means, and in the inclusion of pulley block means on said cable adjacent the upper end of said cylinder and piston means adapted to be engaged by lifting hoist means and operable to dump said bucket independently of said cylinder and piston means.

13. The combination defined in claim 8 characterized in that said locking means includes a shaft extending transversely of said bucket and journaled on the wall thereof, hook means projecting from said shaft and rotatable into and out of locking engagement with keeper means on said side frames, an operating handle on one end of said shaft, and keeper means on one of said side frames engaged over said handle and effective to hold said shaft positively positioned with said hook means interlocked with the associated keeper means on said side frames.

14. In combination, a heavy-duty trailer assembly for hauling loose bulk material and for dumping the same beneath and between the opposite ends of said assembly, said assembly having long rigid side frames rigidly connected together transversely of their opposite ends, carriage means supporting said frame ends, semicylindrical bucket means having a shaft extending through the opposite side walls thereof and fixed to bearing bracket means fixed to the upper edges of the midlength of said side frames, a tubular housing journaled on said shaft with its opposite ends fixed to the interior side wall surfaces of said bucket, a pair of torsion springs surrounding said shaft ends exteriorly of said bucket side walls and having one end of each anchored to said bucket and their remote ends anchored to said side frames, and said springs being effective to rotate said bucket toward the upright cargo-carrying position thereof.

15. The combination defined in claim 14 characterized in that the anchorage for the remote outer ends of said torsion springs includes sleeves journaled on said shaft ends and positioned between said shaft ends and said bearing bracket means, and adjustable means between said sleeve and bearing bracket means for locking said sleeve selectively in predetermined rotated positions to vary the counterbalancing effectiveness of said torsion springs on said bucket.

References Cited in the file of this patent
UNITED STATES PATENTS

| | | |
|---|---|---|
| 859,928 | Donnelly | July 16, 1907 |
| 1,405,065 | Nelson | Jan. 31, 1922 |
| 2,273,583 | Meister | Feb. 17, 1942 |
| 2,764,304 | Johnson | Sept. 25, 1956 |